Patented Apr. 14, 1931

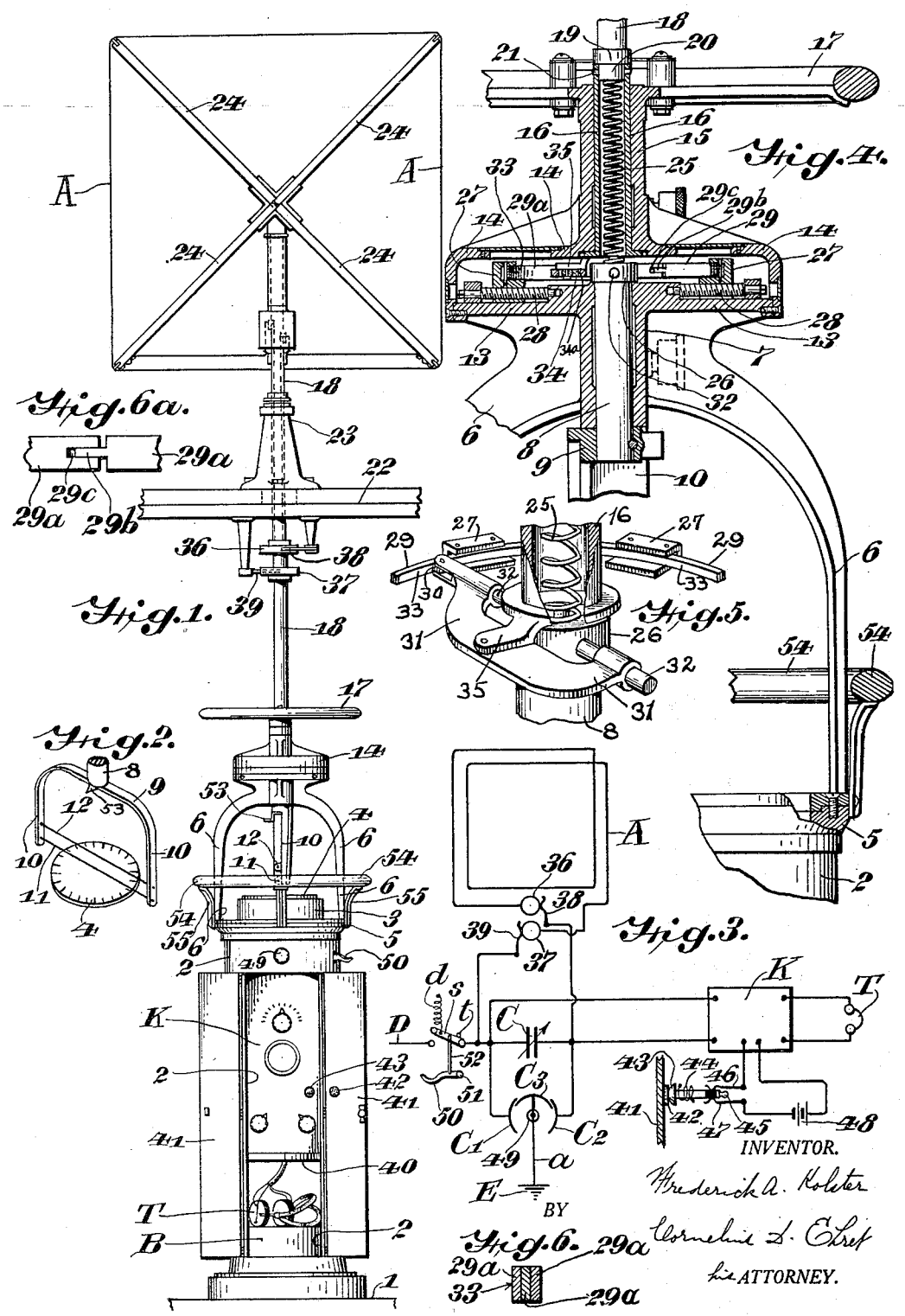

1,800,454

UNITED STATES PATENT OFFICE

FREDERICK A. KOLSTER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

RADIO COMPASS

Application filed June 2, 1925. Serial No. 34,314.

My invention relates to directional radio apparatus or radio compasses for finding the bearing or direction and sense of direction of a radio beacon or other transmitter of electroradiant energy, and utilizable either on shipboard, aircraft or at a shore station.

In accordance with my invention, there is utilized radio receiving apparatus consisting of or including an electrical system having a non-uniform directional characteristic and comprising a member, such as a rotatable coil, movable to position related to the direction of propagation of the received energy, and movable in unison with or in predetermined relation to such movable member is a pointer or equivalent sighting device co-operating with a bearing scale or card of a compass carried by a cabinet, housing or hollow pedestal in which is housed the receiving apparatus or a substantial part thereof.

Further in accordance with my invention, control of one or more of the controlled devices is effected by one or more manually operable members disposed upon the exterior of the housing.

Further in accordance with my invention, the housing or cabinet is provided with door structure whose movement effects control of the receiving apparatus, and particularly of the circuit of the filaments or cathodes of the vacuum tubes of the receiving apparatus.

Further in accordance with my invention, there is provided a hand rail upon the housing or pedestal adjacent the compass or bearing scale.

Further in accordance with my invention, the deformable cam member of a device for correcting for wave front distortion is composed of a plurality of deformable laminæ, one enclosed within the other.

My invention resides in apparatus of the character hereinafter described and claimed.

For an illustration of one of the various forms my invention may take, reference is to be had to the accompanying drawing, in which:

Figure 1 is an elevational view of apparatus embodying my invention.

Fig. 2 is a fragmentary perspective view of a bearing scale or compass card in association with the pointing or reading device.

Fig. 3 is a diagrammatic view of one of the circuit arrangements utilizable in accordance with my invention.

Fig. 4 is a fragmentary elevational view, on enlarged scale, partly in vertical section, of apparatus shown in Fig. 1.

Fig. 5 is a fragmentary perspective view, partly in section, of parts of the compensator.

Figs. 6 and 6a are respectively sectional and fragmentary side elevational views of the laminated deformable cam of the correcting device.

Referring to Fig. 1, upon the floor 1, as of a ship's pilot house, is disposed the housing, cabinet or hollow pedestal 2, on whose upper end is carried a ship's compass 3 having the compass card 4, Fig. 2. The compass 3 may be of the usual magnetic type, or it may be of the repeater type controlled by a gyroscopic master compass, or the bearing scale 4 may alone be carried upon the housing 2 either in fixed relation thereto or movable, as a dumb compass card.

Surmounting the housing 2 is the annular member 5, upstanding from which are the arms or supports 6 joined to the hub 7 forming a bearing for the rotatable vertical shaft 8, upon whose lower end is secured the bracket 9 having the downwardly extending arms 10, by which are carried the horizontally extending sighting wires 11 and 12 disposed one vertically above the other and coacting with the scale 4. Secured to or integral with the hub 7 is the plate 13, of a device for correction of wave front distortion, such, for example, as described in patent to Greaves 1,691,569, issued November 13, 1928. Upon the member 13 is secured the hood or casing member 14 having the stationary hub or bearing member 15, in which is rotatable the hollow shaft 16 rotatable by the hand wheel 17 secured thereto. The shaft 18 is aligned with the shaft 16 and has at its lower end the collar 19 abutting against the upper end of the hollow shaft 16 and having the portion 20 extending into the hollow shaft 16 and secured thereto by pin 21.

The shaft 18 extends upwardly through the roof 22 of the pilot house and through the ball bearing pedestal 23 and carries on its upper end the frame 24, upon which is wound the coil A of suitable number of turns and dimensions, as common in radio compass practice.

Within the hollow shaft 16 is the helical spring 25, secured at its one end to the member 20, and therefore to the shafts 16 and 18, and secured at its other end to the head or collar 26 upon the upper end of the shaft 8.

Slidable radially on the upper surface of the plate 13 are the several blocks 27, adjustable radially by the adjusting screws 28. Carried by the blocks 27 is the cam 29 deformable by the adjusting screws 28 to internal contour corresponding with wave front distortion throughout a complete circumference. The cam is composed of several deformable laminæ 29a, Fig. 6, extending parallel to the shaft axis. Each lamina has at one end a tongue 29b entering a slot 29c in its other end, as indicated in Fig. 6a.

Co-acting with the inner face 33 of the laminated cam 29 is a roller 30, carried by the yoke member 31 moved radially of the shafts 8 and 16 by the roller 30 upon the rod 32 secured to and extending radially from the member 26 on shaft 8. In the yoke member 31 is a radially extending slot 34a in which engages a pin or roller 34 carried by the member 35 secured to the hollow shaft 16.

Rotation of the bearing coil A by hand wheel 17 causes rotation of the shaft 16, which drives the shaft 8 and the pointing mechanism through the spring 25. However, relative movement of the shaft 8 with respect to the shaft 16, for correction for wave front distortion, is determined as described in the aforesaid application by the cam 29.

The terminals of the coil A connect by conductors extending through the hollow shaft 18 with the slip rings 36 and 37, Figs. 1 and 3, upon which bear, respectively, the brushes 38 and 39, to which latter are connected conductors, not shown, extending into the housing or pedestal 2.

Connected in series with the coil A in a closed circuit is the tuning condenser C, in shunt to which are the serially connected condensers C1 and C2 having the common rotatable armature or plate structure C3, whereby there are in series with each other and in shunt to the condenser C complementarily variable condensers to a point between which is connected a conductor a, as an open or antenna path, to earth, ship's hull or counter-capacity E.

For determining the bearing of a beacon or distant transmitter, the coil A is rotated to a position of minimum response; this may not be true bearing position in that some slight signal may still be heard. The condenser armature C3 is moved backwardly and forwardly while the coil A is also moved backwardly and forwardly within a very narrow arc until absolute silence in the telephones is obtained, from which it is then known both that the plane of coil A is normal to the bearing (disregarding wave front distortion) and that the condenser armature C3 is in that position which makes the closed circuit strictly symmetrical about the connection a.

In a cabinet or casing K, which may also house the condenser C and/or the condensers C1, C2, if desired, are the elements of any suitable radio receiving system, such, for example, as comprise one or more stages of thermionic radio frequency amplifiers, a detector, and one or more stages of audio frequency amplification delivering amplified audio frequency current to the signal-translating instrument or telephone T.

The cabinet K may be disposed, as indicated in Fig. 1, within the housing or pedestal 2, as upon a suitable shelf 40, beneath which may be stored the telephone T, provided with a flexible cord extending into the cabinet K, and, in addition, if suitable or desirable, the anode circuit battery B of the radio receiving apparatus. The housing or pedestal 2 is provided with door structure 41, which may carry a rubber or similar pad 42, adapted to engage and press inwardly, when the door is closed, the head 43, in oppoition to spring 44, of a jack or switch 45, which when the door is in open position connects the contacts 46 and 47 to close the circuit of the battery 48, which supplies the current to the cathodes or filaments of the several vacuum tubes of the receiving apparatus; when the door is closed, switch 45 is opened.

The condensers C1, C2 may be disposed in the upper end of the housing 2, and their common rotatable armature C3 may be rotatably adjusted by rotating the knob 49 secured upon a shaft of the armature C3 on the exterior of the housing.

For determining sense of direction of a radio beacon or distant transmitter, there may be utilized, as described in my U. S. Patent 1,759,119, issued May 20, 1930, the auxiliary antenna or equivalent absorption structure D, which may be of any suitable character, such, for example, as an insulated conductor D lying upon the deck of a ship or otherwise suitably disposed adjacent the receiving system. The auxiliary absorption structure D is normally out of electrical communication with the receiving system because the switch s, Fig. 3, is normally held open against the stop t by the spring d. When the bearing has been determined as above described, the switch s, located within the upper end of the housing 2, may be closed by depressing the operator's handle 50 projecting to the exterior of the housing 2. The lever 50 is pivoted at 51 and is connected to the switch lever s by the link 52 pivoted to both. By closing the switch s as described, the auxiliary antenna or absorption structure D is brought into electrical communication with the receiving system, and particularly with one terminal of the condenser C or coil A of the closed circuit, in which case the symmetry of the closed circuit with respect to the open or antenna path, as previously effected by the complementarily variable condensers C1 and C2, when finding the bearing of the distant station, is changed, and, in addition, the energy absorbed by the conductor D affects the receiving system in a manner to assist in determining the sense of direction of a radio beacon or distant transmitter, a pointer 53 carried in suitable position upon the bracket 9 serving to point toward the beacon or distant transmitter.

The arm 6, within which rotate the bracket arms 10, is in turn surrounded by the observer's hand rail 54, carried by members 55 secured to the ring member 5. The rail 54 permits the observer to steady himself in observing position over the sighting wires 11, 12, and in general, to steady himself in operation of the mechanism as a whole, including the coil-rotating wheel 17, particularly in rough weather.

What I claim is:

1. Radio direction-finding apparatus comprising an electrical system having a non-uniform directional characteristic, a member comprised in said electrical system rotatable to position related to the direction of propagation of the received energy, a housing disposed substantially in the axis of rotation of said member, radio signal translating apparatus operatively related to said electrical system, disposed within said housing to effect at least approximate symmetry of said apparatus and said member in said system, a direction scale carried by said housing, and a pointer movable with said rotatable member co-acting with said scale.

2. Radio direction-finding apparatus comprising a closed circuit, rotatable means in said circuit having a non-uniform directional characteristic, an open path, a housing disposed substantially in the axis of rotation of rotatable means, radio signal translating apparatus operatively related to said circuit positioned within said housing to effect at least approximate symmetry of said rotatable means and said apparatus in said open path, means to determine precisely the degree of symmetry between said closed circuit and said path, means operable from the exterior of said housing for controlling said symmetry-determining means, a direction scale carried by said housing, and a pointer movable with said rotatable means co-acting with said scale.

3. Radio direction-finding apparatus comprising a closed circuit, a rotatable bearing coil in said circuit, an open antenna path, a vertical operating shaft therefor, a housing disposed substantially in the axis of rotation of said shaft, radio signal translating apparatus operatively related to said circuit positioned within said housing to effect at least approximate symmetry between said bearing coil and apparatus to a point in said open path, a direction scale carried by said housing, and an indicator carried by said shaft and co-acting with said scale.

4. Radio direction-finding apparatus comprising a closed circuit, a rotatable member, a bearing coil actuated thereby, an open antenna path, a housing disposed in the axis of rotation of said member, radio signal apparatus conductors carried by said member operatively connecting said coil and said apparatus, said apparatus being disposed in said housing to effect at least approximate symmetry of said coil, conductors and apparatus to a point in said path, a direction scale carried by said housing, and an indicator movable with said rotatable member and coacting with said scale.

5. Radio direction-finding apparatus comprising a closed circuit, rotatable means in said circuit having a non-uniform directional characteristic, an actuating shaft therefor, a housing substantially in the axis of rotation of said shaft, radio signal translating apparatus operatively related to said circuit disposed in said housing to effect at least approximate electrical symmetry of said rotatable means and said apparatus, an auxiliary absorbing conductor, switching mechanism in said housing operable from the exterior thereof for connecting said auxiliary conductor with said circuit, a direction scale carried by said housing, and a pointer movable with said rotatable means and co-acting with said scale.

6. Radio direction-finding apparatus comprising a closed circuit, rotatable means in said circuit having a non-uniform directional characteristic, an open path, a housing substantially in the axis of rotation of said rotatable means, means precisely to determine symmetry between said closed circuit and said path disposed in said housing, means operable from the exterior of said housing for controlling said symmetry determining means, an auxiliary absorbing conductor, switching mechanism in said housing operable from the exterior thereof for connecting said auxiliary conductor with said circuit, a direction scale carried by said housing, and a pointer movable with said rotatable means and coacting with said scale.

In testimony whereof I have hereunto affixed my signature this 19th day of May, 1925.

FREDERICK A. KOLSTER.